(12) United States Patent
Zhao et al.

(10) Patent No.: US 6,529,501 B1
(45) Date of Patent: *Mar. 4, 2003

(54) METHOD AND APPARATUS FOR INTERNET TELEPHONY

(75) Inventors: John H. Zhao, San Jose, CA (US); Mark Dreher, Boulder, CO (US); Michael J. Musiel, Cleveland, WI (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,814

(22) Filed: May 29, 1998

(51) Int. Cl.[7] ............................................. H04L 12/66
(52) U.S. Cl. ..................... 370/353; 370/401; 379/88.17
(58) Field of Search ................................ 370/352, 353, 370/354–356, 400, 401; 379/209, 88.17

(56) References Cited

U.S. PATENT DOCUMENTS 5,661,790 A * 8/1997 Hsu ........................... 379/209
5,889,774 A * 3/1999 Mirashrafi et al. .......... 370/352
6,069,890 A * 5/2000 White et al. ................ 370/352

* cited by examiner

Primary Examiner—Hassan Kizou
Assistant Examiner—John Pezzlo
(74) Attorney, Agent, or Firm—McDonnell Boehnen Hulbert & Berghoff (57) ABSTRACT

A telephony method and apparatus for communicating over a network. The apparatus has a device for receiving a signal representing a telephone number from a digital network. In addition, the apparatus includes a database containing a plurality of telephone numbers and a corresponding plurality of network addresses. The database is coupled to the receiving device. The apparatus also includes a device for transmitting, over the digital network, a signal representing an internet address corresponding to the telephone number. The transmitting device is coupled between the database and the digital network. The telephony method includes configuring a local encoder for internet telephony and querying and address mapping server for a destination address. The telephony method also includes searching a database associated with the address mapping server for the destination address and returning the destination address from the address mapping server to the local encoder. In addition, the telephony method includes establishing a connection between the local encoder and the destination address.

14 Claims, 7 Drawing Sheets

METHOD AND APPARATUS FOR INTERNET TELEPHONY

BACKGROUND OF THE INVENTION

The invention relates generally to a communication system, and more particularly, to a method and apparatus for internet telephony. The communication infrastructure currently in place includes the Public Switched Telephone Network ("PSTN"). The PSTN provides real-time speech communication to subscribers throughout the world.

Figure 1:
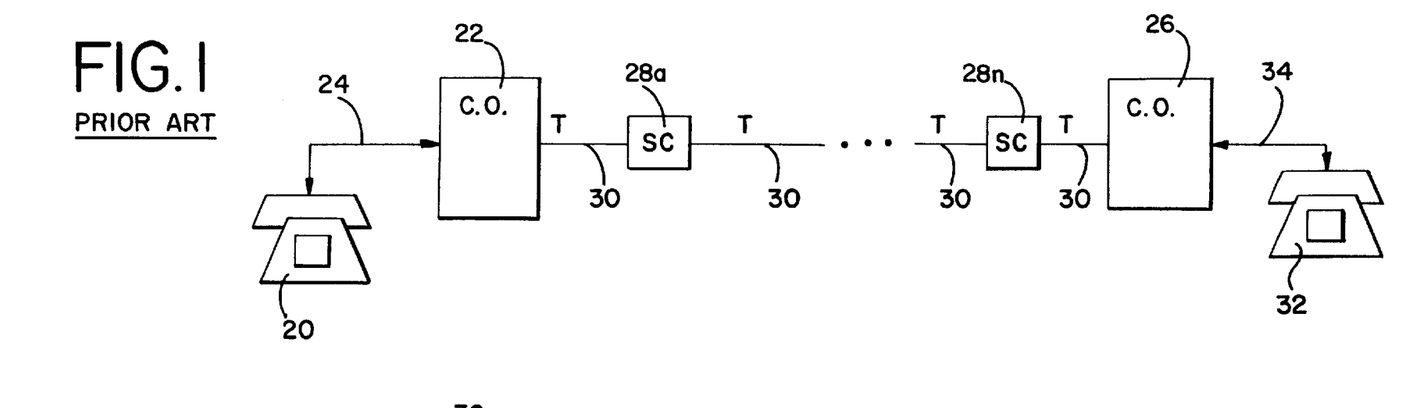
FIG. 1 illustrates a typical PSTN connection between two subscribers.

The general structure of a PSTN connection between two subscribers in shown in FIG. 1. A first subscriber 20 is connected to a central office 22 by a subscriber loop 24. The central office 22 is then connected to a second central office 26 through a number of switching centers 28a . . . 28n, which are connected to each other and to the central offices 22 and 26 by trunks 30. A second subscriber 32 is connected to the central office 26 by a subscriber loop 34.

A disadvantage of this communication system is its expense to the subscribers, particularly the rates that may be charged to subscribers for long distance service. Generally speaking, long distance service rates are higher than rates for local service. In addition, subscribers may have different service providers for long distance service than they have for local service, adding complexity to the communication services.

It would therefore be desirable to have a method and apparatus for internet telephony.

SUMMARY OF THE INVENTION

In accordance with a first aspect of the present invention, an improved telephony method for communication over an internet is provided. The telephony method includes configuring a local encoder for internet telephone and querying an address mapping server for destination address. The query is transmitted from the local encoder. The telephony method also includes searching a database associated with the address mapping server for the destination address and returning the destination address from the address mapping server to the local encoder. In addition, the telephony method includes establishing a connection between the local encoder and the destination address.

In accordance with a second aspect of the present invention, an improved telephony method for communication over an internet, utilizing a local encoder and a remote encoder that are connected by a public switched telephone network, is provided. The telephony method includes establishing a connection between a user and the local encoder and connecting the local encoder to the remote encoder via a public switched telephone network connection. In addition, the telephony method includes establishing an internet connection between the local encoder and the remote encoder. The telephony method further includes dropping the public switched telephone network connection between the local encoder and the remote encoder.

In accordance with a third aspect of the present invention, an apparatus in a communication system for communicating between subscribers to a network is provided. The communication system has a telephone network coupled to a number of encoders and a digital network interconnecting at least two of the number of encoders. The apparatus includes a device for receiving a signal representing a telephone number from the digital network and a database containing a plurality of telephone numbers and a corresponding plurality of network addresses. The database is coupled to the receiving device. The apparatus also includes a device for transmitting, over the digital network, a signal representing an internet address corresponding to the telephone number. The transmitting device is coupled between the database and the digital network.

DETAILED DESCRIPTION OF PRESENTLY PREFERRED EMBODIMENTS

Figure 2:
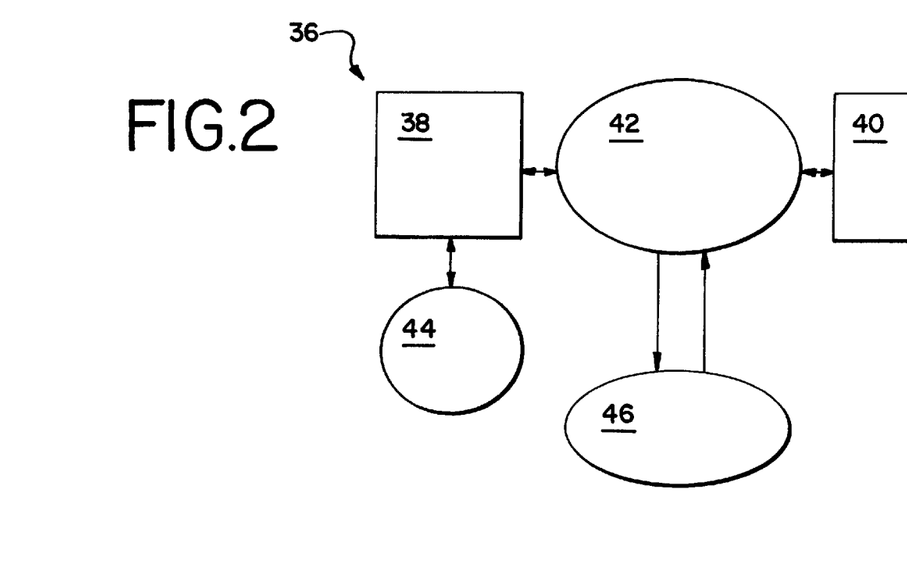
FIG. 2 is a block diagram showing a communication system having a network access encoder and an address mapping server.

The presently preferred embodiments will now be described with reference to the drawings, in which like elements are identified by like numerals. FIG. 2 is a block diagram showing a communication system 36. A local central office 38 is coupled to a remote central office 40 by an internet 42. The local central office 38 is also coupled to a network access encoder 44. An address mapping server 46 is coupled to the internet 42.

As used herein, the term "internet" includes any network for transmitting information in accordance with set of protocols. The internet 42 is preferably a wide area network (WAN) or a combination of large computer networks joined together over high-speed backbone data links. In addition, it is preferable that the internet 42 interconnects central offices (a.k.a. public exchanges), such as the local central office 38 and the remote central office 40, throughout the PSTN.

An example of one such computer network is commonly referred to as the "Internet," which provides connectivity to central offices throughout the world. A typical set of networking protocols in current usage for transmitting data over the Internet is the Transmission Control Protocol/internet Protocol ("TCP/IP") suite. Networking protocols, such as TCP/IP, allow communication over interconnected networks including computers having various architectures and operating systems. The Internet is based upon packet switching technology. ITU-T Recommendation X.25, which is incorporated herein by reference, is an international standard governing packet switched networks, such as the Internet. TCP/IP is generally known to those skilled in the art of data communications as the family of common Internet protocols. Nonetheless, for purposes of describing the operation of the preferred embodiments, the following background is provided.

In terms of networking functionality, TCP/IP includes a Network Interface Layer, an Internet Layer, a Transport Layer and an Application Layer. The Network Interface Layer manages the exchange of data between a network and a device attached to the network and routes data between devices on the same network.

The Internet Layer of the TCP/IP suite provides the addressing method to allow routers to forward packets across the Internet, i.e. between networks. This is accomplished by assigning to each packet an Internet Protocol ("IP") address. As currently implemented, IP addresses are thirty-two (32) bits in length and have two parts. The first part of the IP address is the network identifier, which specifies an address that is unique across the Internet for a network or a related group of networks. Network identifiers are typically assigned by a central authority, the Internet Assigned Numbers Authority (www.isi.edu/div7/iana/). The second part of the IP address is a host identifier, which specifies a particular host, station or node within a given network. The host identifier need only be unique within the given network and may therefore be assigned by a local network administrator.

Under the current scheme for formatting and assigning IP addresses, there is an insufficient number of IP addresses to permanently assign an IP address to each telephone number in the world. It is envisioned that the bit length of the IP address in the future may be expanded sufficiently to allow permanent IP addresses to be assigned to each telephone number or to each user.

At the Transport Layer, the Transmission Control Protocol ("TCP") is run. TCP provides end-to-end connectivity between data source and destination and further provides for error control by the detection of, and recovery from, lost, duplicated or corrupted packets. In TCP, message blocks from applications are divided into smaller segments or packets and a sequence number, indicating the order of the segment within the block, is appended to each segment. The destination device may use the sequence numbers to reconstruct the message block by appropriately ordering the segments. In addition, when the destination device receives a complete sequence of segments, it may send an acknowledgment (ACK) to the data source containing the number of the next byte expected to the destination.

Referring again to FIG. 2, the network access encoder 44 acts as an interface between the central office 38 and the internet 42. The network access encoder 44 is therefore capable of converting a signal from the central office 38 into a signal having an internet compatible format and vice versa. For example, the network access encoder 44 may covert the signal from the central office 38 into a TCP/IP signal. In terms of physical location, the network access encoder 44 typically will be installed at a central office location or at the facilities of an internet service provider. Further description of the network access encoder 44 is provided below with reference to FIG. 4.

The address mapping server 46 is preferably an internet host system that is permanently connected to the internet 42. An IP address is permanently assigned to the address mapping server 46 and that address is known by all network access encoders, such as the network access encoder 44, that are coupled to the internet 42.

Figure 3A:
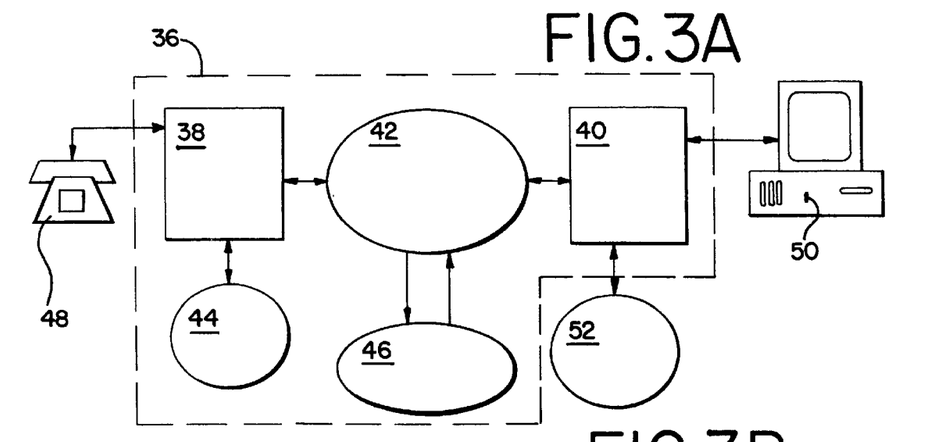
FIG. 3A is a block diagram illustrating a first type of connection using the communication system shown in FIG. 2.
Figure 3B:
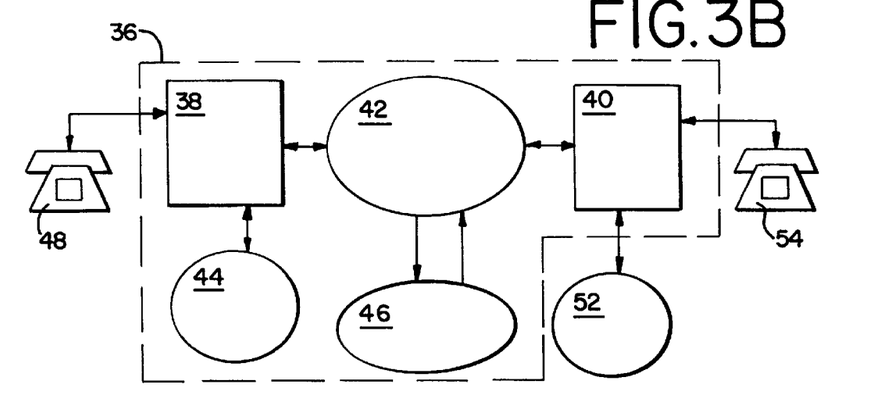
FIG. 3B is a block diagram illustrating a second type of connection using the communication system shown in FIG. 2.
Figure 3C:
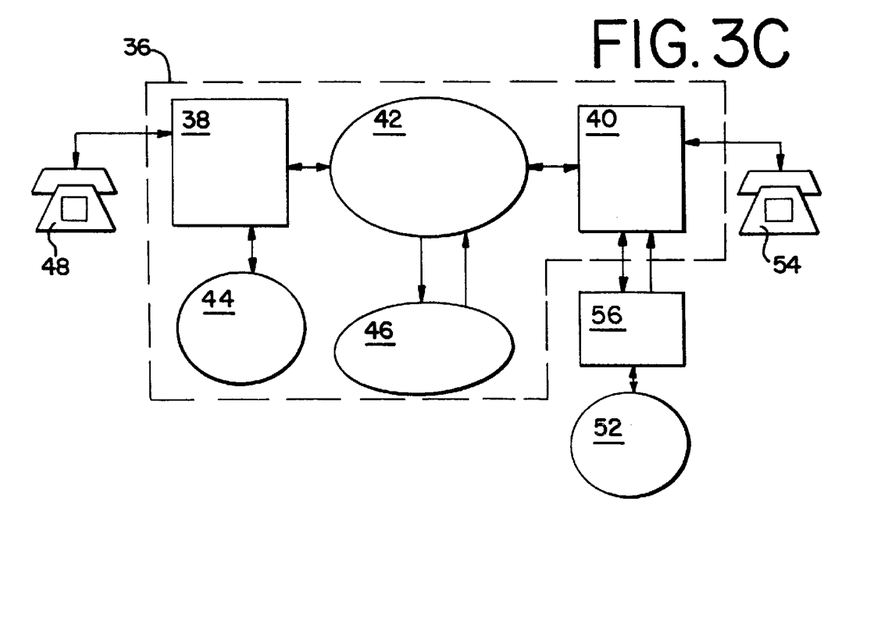
FIG. 3C is a block diagram illustrating a third type of connection using the communication system shown in FIG. 2.

In FIGS. 3A through 3C, three exemplary applications of the communication system 36 are presented. FIG. 3A is a block diagram illustrating a first type of connection using the communication system 36 shown in FIG. 2. A telephone 48 is coupled to the local central office 38. A computer 50 is coupled to the remote central office 40. Also coupled to the remote central office 40 is a network access encoder 52, which is functionally comparable to the network access encoder 44. The fist type of connection is therefore a telephone-to-computer connection.

FIG. 3B is a block diagram illustrating a second type of connection using the communication system 36 as shown in FIG. 2. For the second type of connection, a telephone 54 is coupled to the remote central office 40, rather than the computer 50 that is shown in FIG. 3A. The second type of connection is a telephone-to-telephone connection.

FIG. 3C is a block diagram illustrating a third type of connection using the communication system 36 shown in FIG. 2. For the third type of connection, an internet service provider 56 is registered locally, and coupled to, the remote central office 40. The remote network access encoder 52 is then coupled to the remote central office 40 through the internet service provider 56.

The telephones 48 and 54 may be ordinary analog subscriber sets on the public switched telephone network ("PSTN"). Alternatively, the telephones 48 and/or 54 may represent, or be replaced by, any internet appliance or software package that uses TCP/IP addressing to reach its final destination The internet appliance or software package should be capable of being updated to run the connection protocol utilized by the address mapping server 46. Examples of such devices include CU-See-Me video conferencing devices, a PDA, a computer, Internet telephone software packages and dedicated hardware devices, any TCP/IP application, or a network addressed application that could make use of a telephone number to indicate the desired user or machine to connect to. The telephones 48 and 54 may alternatively be a cellular telephone with a cellular base station instead of a central office, a set-top box, or any combination of the foregoing. The computer 50 may be a multimedia computer equipped with a modem and a sound card. All that is required of the target internet appliance 50 or 54 is that it have the capability of accessing the internet or the PSTN. The addressing method described herein works as well with devices that access PSTN service and signal via DTMF techniques or devices that access the internet directly, such as LAN connected workstations.

In FIGS. 2 and 3A through 3C, the network access network 44 will typically be installed at the local central office 38. As an alternative, the network access encoder 44 may be installed at the facilities of a local internet service provider (not shown) that is coupled to the local central office 38. If the local network access encoder 44 is installed at a local internet service provider, then the local user may obtain access to the internet 42 by placing a call to the internet service provider using a designated internet telephone access number.

Figure 4:
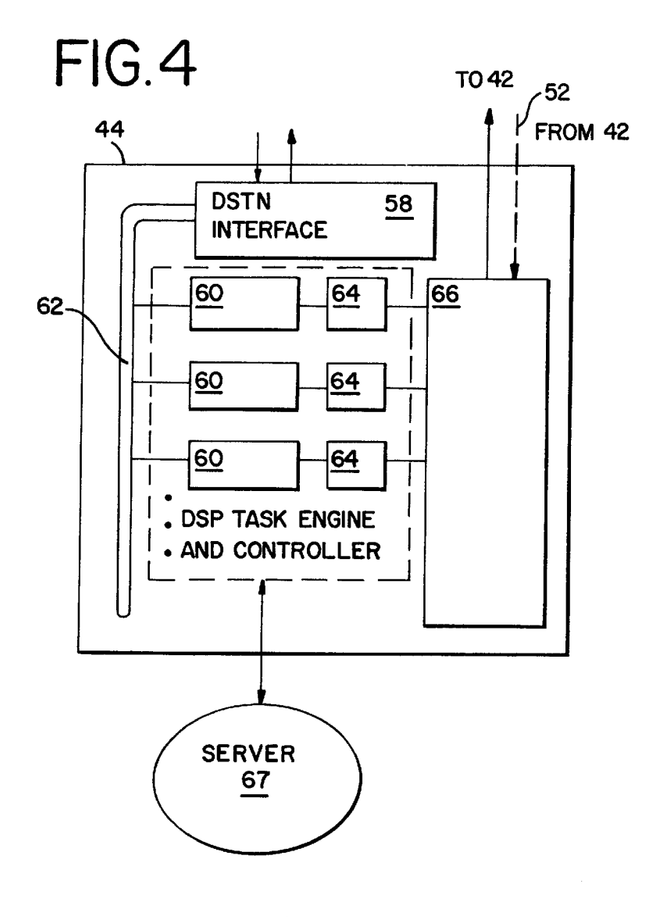
FIG. 4 is a block diagram of the network access encoder shown in FIG. 2.

FIG. 4 is a block diagram of one embodiment of a network access encoder, such as the network access encoder 44 shown in FIG. 2. The network access encoder 44 includes an interface 58, which is preferably capable of interfacing to the public switched telephone network ("PSTN") two-wire analog, T1, E1, T3, E3, ISDN and primary rate services. Traffic on the PSTN may consist of standard analog audio, digital traffic encoded in a modem carrier, and primary rate data. The traffic on any of the services may be audio, video, data or any combination thereof. Any of this traffic may be switched to the interface 58 from the central office 38. For embodiments in which the user device 48 is a standard analog telephone, the interface 58 need only be capable of receiving analog audio.

As shown in FIG. 4, the interface 58 is coupled to an arrangement of digital signal processors ("DSPs") 60 by a bus 62. The bus 62 is preferably a time division multiplexed ("TDM") bus. Each DSP 60 preferably may be reconfigured in real time to support the different types of traffic. The reconfiguration of the DSPs 60 may be accomplished by programming the DSPs 60 to perform specific tasks on information carried by the bus 62. A file server (not shown) containing DSP code may be associated with the DSPs 60 for programming the DSPs 60. As an example of this reconfiguration, for an internet telephone call placed from a standard analog subscriber's telephone, the traffic is analog audio and the DSPs 60 are programmed to detect the destination telephone number utilizing, for example, a dual tone multi-frequency detector task. DSPs that are suitable for this application are available from several vendors, including Texas Instruments of Austin, Tex.

Each DSP 60 is coupled to an embedded task microprocessor 64. The embedded task microprocessors 64 encode data received from the DSPs 60 into TCP/IP format. The encoded data is then coupled to the internet 42 by a gateway 66. The embedded task microprocessors 64, therefore, encode the destination telephone number into a TCP/IP request packet and transmit the request packet to the address mapping server 38 via a gateway 66. Preferably, the embedded task microprocessors 64 are also supported by a file server 67. A commercially available microprocessor that is suitable for use as the embedded task microprocessor 64 may be selected from among several vendors, including the Power PC from Motorola, Inc. of Schaumburg, Ill. In accordance with a preferred embodiment, a DSP 60/microprocessor 64 pair is chosen to support access to Global or Shared Memory in order to allow parameters and new program subroutines to quickly pass between them.

The structure of the network access encoder 52, which is shown in FIGS. 3A, 3B and 3C, is preferably the same as the structure of the network access encoder 44. In terms of function the network access encoder at the remote side of a connection, such as the network access encoder 52, performs the inverse of the functions performed by a local network access encoder, such as the network access encoder 44. For example, if the local network access encoder 44 converts an analog audio signal into a signal conforming to an internet protocol, then the remote network access encoder 52 may convert the internet signal into an analog audio signal or such other signal format as may be required by the destination appliance 50 or 54. As used herein, the term "internet signal" is interchangeable with "a signal conforming to an internet protocol."

A network access encoder that is suitable for use as the network access encoders 44 and 52 is described in U.S. Pat. Nos. 5,528,595 and 5,577,105 which are incorporated herein by reference. In U.S. Pat. Nos. 5,528,595 and 5,577,105, the network access encoder is referred to as a "network access server" or "NAS." The network access encoders 44 and 52 preferably have file server 67 support.

A network access encoder 44/52, as shown in FIG. 4, is commercially available from 3Com Corporation of Santa Clara, Calif. The 3Com Total Control Hub may have a capacity of twelve (12) modem cards, each modem card having four (4) DPSs 60 and five (5) embedded task microprocessors 64 that support four (4) channels, for a total capacity of forty-eight (48) channels. Remote access products or DSP engines from other vendors may alternatively be used. For example, the Audio Teleconferencing Bridge, marketed by Coherent Communications Systems Corp. of Leesburg, Va. may be configured to perform the tasks of the network access encoder 44/52.

Figure 5:
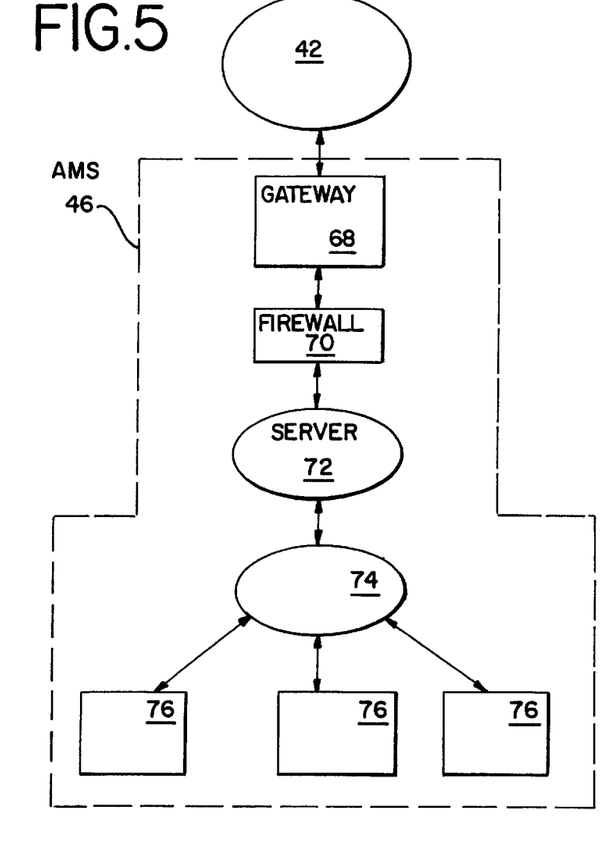
FIG. 5 is a block diagram of the address mapping server shown in FIG. 2.

Referring now to FIG. 5, a block diagram of the address mapping server 46, shown in FIG. 2, is presented. The address mapping server 46 may be similar, in terms of hardware and basic software requirements, to a Domain Name Server ("DNS"). The address mapping server 46 is coupled to the internet 42 through a gateway 68. An internet server 72 is coupled to the gateway 68 through a firewall 70. The firewall 70 protects the address mapping server 46 from external unauthorized internet access. The firewall may be any of the standard firewall products that are commercially available so long as it is compatible with the network access encoder hardware. For example, the firewall products marketed under the trade names AutoSecure, marketed by Platinum Technology, Inc. of Oakbrook Terrace, Ill.; BorderWare Firewall Server marketed by Secure Computing Corporation of San Jose, Calif.; Defensor Server marketed by Sagus Security of Ottawa, Ontario, Canada; Eagle Firewall marketed by Raptor Systems, Inc., of Waltham, Mass.; ICE. Block marketed by J.River, Inc. of Minneapolis, Minn., and Interceptor marketed by Zeuros Network Solutions of Hampshire, United Kingdom may be used.

Preferably, the internet server 72 has a WINDOWS NT or UNIX operating system, although any custom or standard client/server may alternatively be used. In addition, the internet server 72 is preferably capable of sending and receiving data in HTML TCP/IP format and converting data in HTML TCP/IP format into a database language, such as SQL.

The internet server 72 is coupled to a database management server 74. The database management server 74 is configured for database management using software packages, such as a database management system (DBMS) and SQL databases. A number of databases 76, such as SQL databases, may be associated with the database management server 74. One skilled in the art of database management would be capable of readily constructive the database management server 74. Any database server that is capable of performing TCP/IP information exchanges may be used including, for example, Domain Name Server devices. DBMS software packages are commercially available under for example, the trade names AutoAction marketed Platinum Techology, Inc. of Oakbrook Terrace, Ill. and Eco Net marketed by Compuware Corporation of Farmington Hills, Mich. SQL databases are available from Gupta, Informix, Microsoft, Powersoft, Oracle and Sybase.

Referring again to FIG. 5, a request packet arriving from the internet 42 at the gateway 68 of the address mapping server 46 may, for example, be one of the following types of requests: 1) a request to map a telephone number to a specific IP address; 2) a request to remove the mapping of a telephone number from a specific IP address; 3) a request to map an IP address of a network access encoder that is associated with a central office into a telephone prefix; 4) a request to remove the mapping of the IP address of a network access encoder that is associated with a central office from a telephone prefix; 5) a request to map an IP address of a network access encoder that is associated with an ISP to a telephone prefix; 6) a request to remove the mapping of an IP address of a network access encoder that is associated with an ISP from a telephone prefix; and 7) a request for IP address information on a telephone number.

When a request packet arrives at the address mapping server 46, the database 76 may be either updated or queried based upon the type of request packet. Types 1 through 6 above are update requests and type 7 is a query. The mapping information described above in preferably maintained in the database 76 until a request to remove the mapping information is received. Thus, unlike a DNS, which stores IP addresses associated with domain names, the address mapping server 46 in accordance with a preferred embodiment associates IP addresses with telephone numbers or telephone prefixes.

The internet server 72 may respond to the request packet in the following ways: 1) acknowledge or "ACK" for database update request packets; 2) "NAK" for database update error or invalid record; 3) a type I record if the destination telephone number is currently mapped to an IP address within the database 76; 4) a type II record if a central office, which is local to the destination telephone number, has an associated network access server whose IP address is found within the database 76; and 5) a type III record of an ISP, which is local to the destination telephone number, has an associated network access server whose IP address is found within the database 76. Type I, type II and type III records are further described below.

Figure 6:
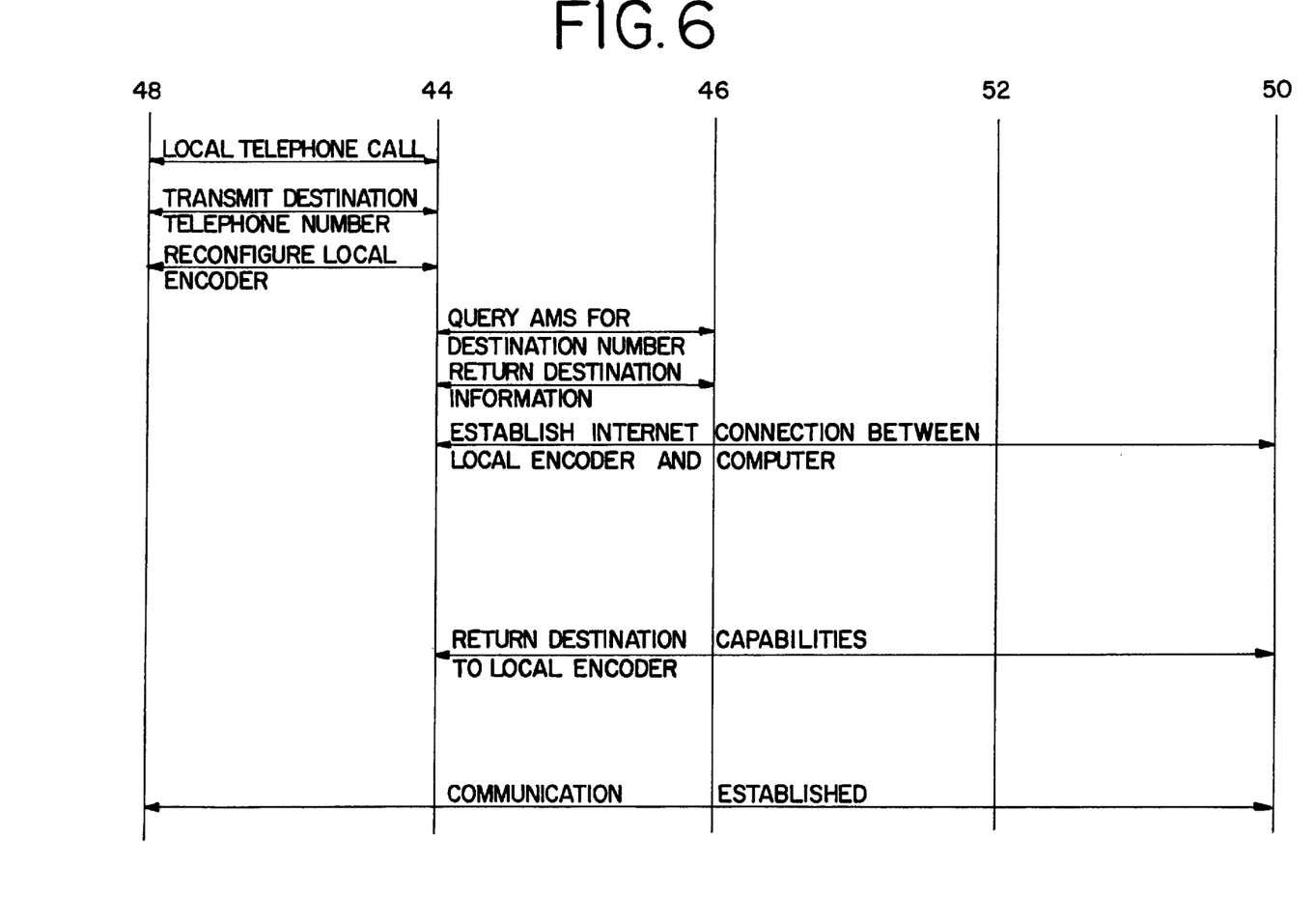
FIG. 6 illustrates a connection sequence for the first type of connection as shown in FIG. 3A.

The operation of the communication system shown in FIGS. 2 through 5 will now be described with references to FIGS. 6 and 7. FIG. 6 illustrates an embodiment of a connection sequence for the first type of connection, shown in FIG. 3A. In FIG. 6, the vertical lines bear reference numerals that correspond to the appropriate structure from FIG. 3A.

As shown in the first column of FIG. 6, a user of the telephone 48 places a local telephone call to the local network access encoder 44 via the local central office 38. In accordance with a preferred embodiment, the user may dial a designated internet telephone access number using the telephone 48. By dialing the internet telephone access number, the caller is connected to the local central office 38, or alternatively, a local internet service provider ("ISP") through the local central office. Preferably, the designated internet telephone access number is a long distance provider number assigned to internet telephone. When access to the local central office 38 (or ISP) is established, the user enters a destination telephone number. The call may then be connected to the network access encoder 44 from the central office 38.

Upon connection of the call to the local network access encoder 44, the DSPs 60, shown in FIG. 4, are reconfigured for internet telephone by the file server associated with the network access encoder 44. The reconfiguration of the DSPs 60 may be accomplished by loading an internet telephone compression task. The internet telephone compression task causes the DSPs 60 to convert data corresponding to the incoming signal into data packets and to transfer the data packets to the embedded task microprocessors 64 and network gateway 66, also shown in FIG. 4, for TCP/IP transmission to the designated IP address. If the incoming signal was previously digitized into a PCM telephone network format, such as μ-law or A-law codes, then the incoming data may be converted into 2's compliment linear data that is suitable for the DSPs 60. An analog interface chip, such as the Texas Instrument TI AC01 device, may convert incoming analog audio into 2's compliment linear data for transmission to the DSPs 60.

As shown in the second column of FIG. 6, the local network access encoder 44 receives the destination telephone number and transmits a data request message, including the destination telephone number, to the address mapping server ("AMS") 46 over the internet 42. Communications between the network access encoder 44 and the AMS 46 are transmitted via the internet 42 in accordance with an internet protocol.

When the data request message is received by the AMS 46, the database management server 74, shown in FIG. 5, searches a database 76 for the destination telephone number. If a user of the computer 50 at the destination telephone number has logged onto the internet with internet telephone capability, then a specific record exists in the database 76 for the destination telephone number. The record includes an IP address corresponding to the destination telephone number. In this case, the AMS 46 returns the IP address corresponding to the destination telephone number to the network access encoder 44. A record that includes an IP address corresponding to the destination telephone number may be referred to herein as "type I" record.

Next, the network access encoder 44 receives the returned type I record and connects to the designated IP address directly via the internet 42, through the central office 40 and encoder 56. At this point, the computer 50 may return its capabilities to the network access encoder 44. The capabilities of the computer 50, or internet appliance, that may be of interest include: types of data that may be generated and/or received, e.g. data, voice and/or audio; the maximum bandwidth that the appliance 50 can accommodate; the compression routines that the appliance 50 supports; and the like. Preferably, the network access encoder 44 is capable, in response to receiving the capabilities of the appliance 50, of selecting the most efficient compression algorithm that the appliance 50 can handle without exceeding the bandwidth of the appliance 50. As an alternative, the AMS 46 may provide system capabilities, associated with each record on file, to the network access encoder 44. Once the network access encoder 44 is connected to the computer 50, communication is established between the user of the telephone 48 and the computer 50.

Figure 7:
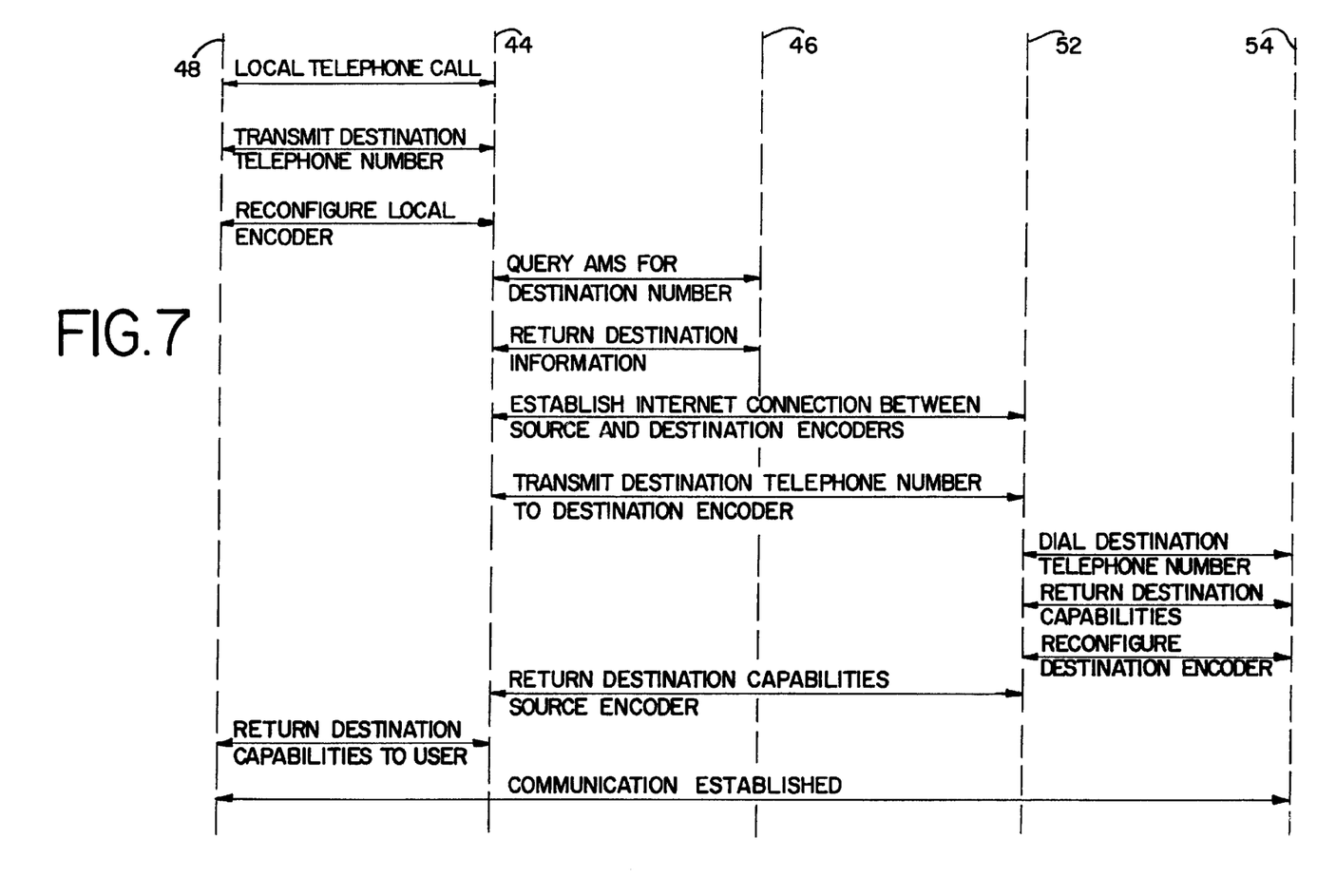
FIG. 7 illustrates a connection sequence for the second type of connection as shown in FIG. 3B.

FIG. 7 illustrates an embodiment of a connection sequence for the second type of connection as shown in FIG. 3B. Like the vertical lines in FIG. 6, the vertical lines in FIG. 7 bear reference numerals that correspond to the appropriate structure from FIG. 3B.

Referring now to FIG. 7, the initial sequence of communication with the local network access encoder 44 is as described above with respect to FIG. 6. A user of the telephone 48, shown in FIG. 3B, places a local telephone call to the local network access encoder 44 via the local central office 38. The user transmits the destination telephone number to the local network access encoder 44 and the local network access encoder 44 is reconfigured for internet telephone.

The local network access encoder 44 receives the destination telephone number and transmits a data request message, including the destination telephone number, to the AMS 46 over the internet 42. Comminations between the network access encoder 44 and the AMS 46 are transmitted via the internet 42 in accordance with an internet protocol.

When the data request message is received by the AMS 46, the database management server 74, shown in FIG. 5, searches a database 76 for the destination telephone number. Unlike the situation wherein the destination telephone number corresponds to a computer, as described above the respect of FIGS. 3A and 6, however, there may not be a specific record in the database 76 for the telephone 54. In this case, therefore, the database management server 74 may search the database 76 for the IP address of a network access encoder that is local to the telephone 54, such as the network access encoder 52 shown in FIG. 3B. If such a record is present in the database 76, the AMS 46 returns the IP address corresponding to the remote network access encoder 52 to the network access encoder 44. A record that includes an IP address corresponding to a network access encoder may be referred to herein as "type II" record.

If the response from the address mapping server is a type II record, then the network access encoder 44 contacts the remote network access encoder 52 having the designated IP address via the internet 42 and transits the TCP/IP formatted destination telephone number. The remote network access encoder 52 then initiates a local dial out via the PSTN interface at the remote central office 40. The remote network access encoder 52 loads an internet telephone DSP compression task and translates the incoming TCP/IP audio data into standard analog audio for transmission over the PSTN to the destination telephone 54.

Once a connection is established to the telephone 54, the capabilities of the telephone 54 may be returned to the telephone 48 through the local and remote access encoders 44 and 52. For example, telephone 54 may return an indication of its capability for generating a receiving various data types, such as voice, data or audio, its maximum bandwidth, or compression routines that it supports. The network access encoder 44 may then utilize the most efficient compression routine that the telephone 54 can accommodate without exceeding the telephone's bandwidth capability. Communication is thus established between the telephone 48 and the telephone 54, and the users of the telephone 48 and 54 may speak over the internet.

A third type of connection is shown in FIG. 3C. The communication sequence for the third type of connection is similar to the communication sequence for the type II record described with respect to FIGS. 3B and 7. The difference is as follows. The remote central office 40, shown in FIG. 3C, does not have an associated network access encoder. Accordingly, the AMS 46 searches the database 76 for an IP address of a network access encoder that is associated with an Internet Service Provider ("ISP") 56 registered locally to the remote central office 40. The ISP 56 registered locally to the remote central office 40 may be referenced to herein as the "target ISP."

If a record including the IP address of the target ISP 56 is found in the database 76, then the AMS 46 returns that IP address to the network access encoder 44. A record that includes the IP address of an ISP 56 registered locally to the remote central office 40 may be referred to herein as "type III" record.

Referring again to FIG. 3C, for a type III record communications from the telephone 48 to the telephone 54 will therefore be routed to the network access encoder 44, where the signals will be converted to an internet signal and transmitted to the remote network access encoder 52 that is associated with the target ISP 56. At the remote network access encoder 52, the internet signal will be converted to a standard telephone signal, such as an analog audio signal, that is transmitted to the telephone 54 via the remote central office 40. Communications from the telephone 54 to the telephone 48 follow the reverse path.

Although the operation of the communication system 36 has been described with reference to the telephone 48 as the device initiating communication, other devices may alternatively be used for initiating and receiving internet telephone communications in accordance with the preferred embodiments. For example, as described above with reference to FIG. 3A, the computer 50 may receive the call or, alternatively, may initiate a telephone call. As further examples, a digital telephone or set-top box may initiate or receive internet telephone communications. Any internet appliance may be used.

It should be noted that in accordance with the preferred embodiments, it is however unnecessary for the users to have anything more than a standard analog telephone. Of course, digital telephones, speakerphones, videophones and the like may also be used, as well as computers and set-top boxes, but these devices are not required by the preferred embodiments. Thus, in accordance with the preferred embodiments, internet telephony may be made available to the large number of households having only standard analog telephones. Moreover, the users are not required to have and operate complex and expensive hardware and/or software with which they may be unfamiliar.

As an alternative to the communication sequences described above, the communication sequences for record types I, II and III may be combined into a single communication sequence. An example of such a combined commination sequence is described below.

The network access encoder 44 receives the destination telephone number from an initiating device, such as the telephone 48 or the computer 50, and transmits a data request message, including the destination telephone number, to the AMS 46 over the internet 42. Communications between the network access encoder 44 and the AMS 46 are transmitted via the internet 42. When the data request message is received by the AMS 46, the AMS 46 searches the database 76 for the destination telephone number, which may or may not appear in the database 76.

If a user at the destination telephone number has logged on to the internet 42 with internet telephone capability, then a specific type I record exists in the database 76 for the destination telephone number. As described above, the type I record includes an IP address corresponding to the destination telephone number. Internet telephone capability means that the destination appliance is capable of sending its IP address to the AMS 76 when the destination appliance is active and connected to the internet 42. The capability may include software that automatically sends IP address information to the AMS 46 when the user logs onto the internet 42. Internet telephone capability may alternatively refer to any device having a permanent IP address and the ability to communicate that IP address to the AMS 46. If found in the database 76, the type I record is returned to the network access encoder 44. The network access encoder 44 uses the type I record to establish an internet connection between the network access encoder 44 and the destination device.

If a type I record for the destination telephone number is not found in the database 76, then the AMS 46 searches the database 76 for an IP address corresponding to a network access encoder 52, which is local to the destination telephone number. The network access encoder 52 that is local to the destination telephone number may be referred to herein as the "target office encoder."

If a record that includes the IP address of the target network access encoder 52, i.e. a type II record, is found in the database 76, then the AMS 46 returns that type II record to the network access encoder 44. The network access encoder 44 uses the type II record to establish an internet connection between the network access encoder 44 and the network access encoder 52.

If a type II record is not found in the database 76, then the AMS 46 searches the database 76 for an IP address corresponding to an ISP registered locally to the remote central office 40. The ISP registered locally to the remote central office 40 may be referred to herein as the "target ISP" and has an associated network access encoder 52. If a type III record, which includes the IP address of the network access encoder 52, is found in the database 76, then the AMS 46 returns that IP address to the network access encoder 44. The network access encoder 44 may then use the type III record to establish an internet connection between the network access encoder 44 and the remote network access encoder 52 that is associated with the target ISP 56.

If the database 76 does not contain any one of a type I record, a type II record and a type III record, then the AMS 46 preferably returns a "failed connect" indicator to the caller through the network access encoder 44 and local central office 38. The failed connect indicator may, for example, be an audio tone or a message.

On the other hand, if the database 76 contains any one of a type I record, a type II record and a type III record, then an internet telephone call may be place. The following paragraphs describe the completion of the internet telephone call in accordance with a preferred embodiment.

For a type I record, the network access encoder 44 uses the IP address returned by the AMS 46 to initiate a direct internet telephone call to the destination telephone number. The network access encoder 44 transmits a "ring" packet via the internet 42 to the IP address associated with the destination telephone number. When the destination device at the IP address "answers," the connection is completed. At this point, the network access encoder 44 may query the destination device for its capabilities (i.e. data compression, bandwidth and the like).

When the network access encoder 44 receives a type II or type III record from the AMS 46, the network access encoder 44 contacts the remote network access encoder 52 associated with the remote central office 40 (type II), or the remote network access encoder 52 associated with the target ISP 56 (type III), corresponding to the returned IP address via the internet 42. Once a connection is established between the network access encoder 44 and the remote network access encoder 52, the network access encoder 44 transmits the destination telephone number via the internet 42 to the remote network access encoder 52. After receiving the destination telephone number, the remote network access encoder 52 initiates a local dial out via its PSTN interface and the remote central office 40, which is local to the destination telephone number. If the destination device is a telephone, the remote network access encoder 52 then loads an internet telephone DSP compression task to translate, for example, TCP/IP audio data from the network access encoder 44 into standard analog audio for transmission over the PSTN to the destination telephone number, and vice versa. If someone or a device answers at the destination telephone number, then the connection is completed.

Preferably, each of the network access encoders that are coupled to the internet 42, such as the network access encoders 44 and 52, is programmed to transit its IP address to the AMS 46. The AMS 46 stores the IP addresses and corresponding telephone numbers in the database 76 for future reference. In addition, it is preferable that the database 76 contains the telephone numbers of those persons having internet telephone capability via a portable or desktop computer. Each computer may be programmed to transmit its assigned IP address to the address mapping server 46 upon long-on to the internet 42. The address mapping server 46 stores the IP address with the corresponding telephone number in the database 76. Moreover, the database 76 may retain IP addresses for those computers having permanently assigned IP addresses.

Although the AMS 46 of the preferred embodiment, as described above, searches first for a type I record, then a type II record and finally a type III record, the AMS 46 may, alternatively, search the record types in a different order. For example, the AMS 46 may search the different record types in accordance with the likelihood of finding each record type in the database 76. In this manner, the amount of time used to conduct the search may be minimized.

The network access encoders 44 and 52 preferably may be programmed to perform the steps described above using software, hardware or a combination of hardware and software. For example, each encoder preferably is coupled to a file server containing the appropriate instructions for an internet telephone call in accordance with the steps described above. The instructions may be downloaded to the DSPs 60 shown in FIG. 4 when a caller initiates an internet telephone call. In this manner, the network access encoders, such as the encoders 44 and 52, may perform other data communication functions when they are not involved in internet telephony.

Figure 8:
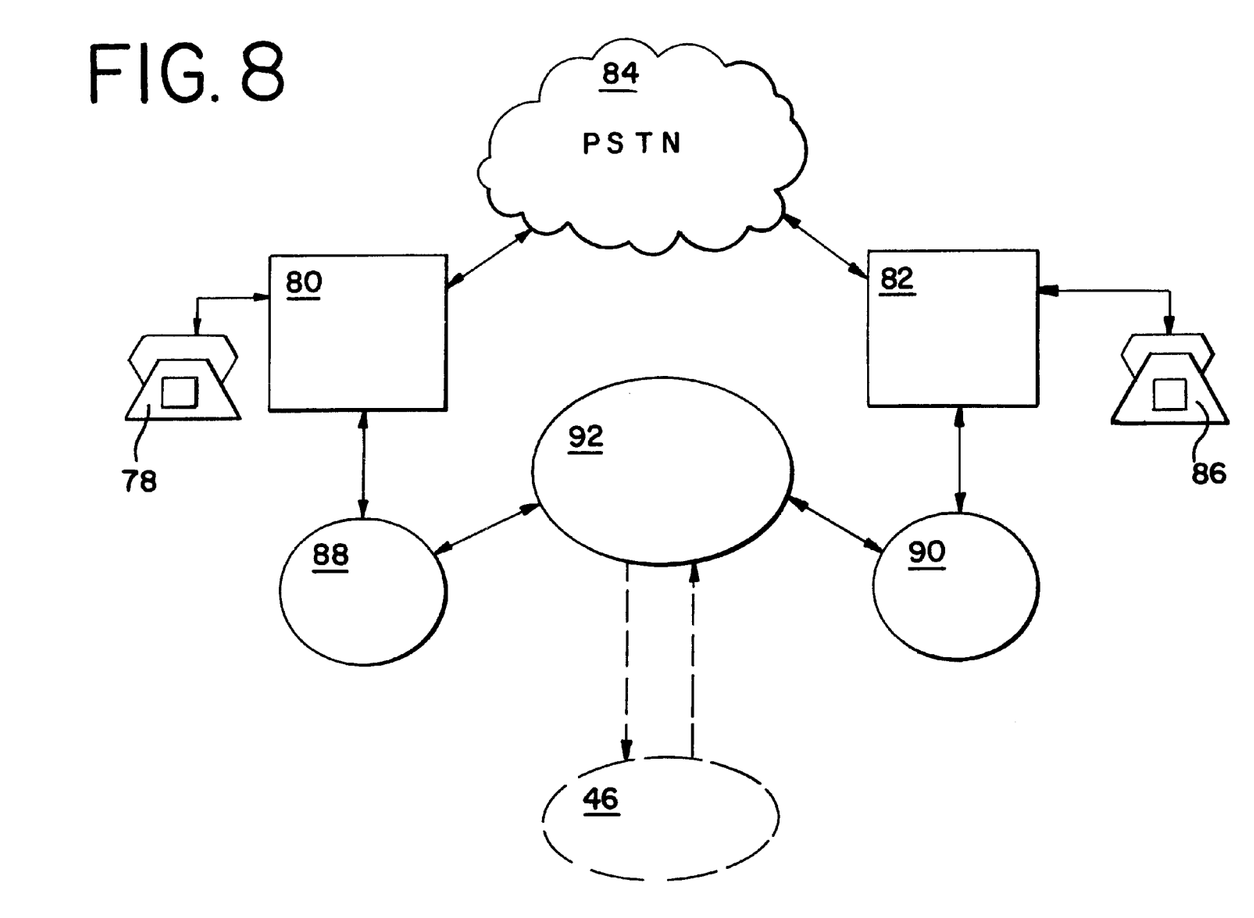
FIG. 8 is a block diagram of an alternative embodiment of a communication system that utilizes the Public Switched Telephone Network and the internet.

An alternative embodiment of the present invention is shown in FIG. 8, which is a block diagram of a communication system that utilizes the PSTN 84 and the internet 92. A telephone 78 is coupled to a local central office 80, which is connected to a remote central office 82 by the PSTN 84. A destination telephone 86 is coupled to the remote central office 82. The telephones 78 and 86 may be standard analog telephones coupled to the central offices 80 and 82, respectively, by a plain old telephone service ("POTS") connection. The POTS connection is typically a two-wire analog connection.

A local network access encoder 88 is coupled to the local central office 80, and a remote network access encoder 90 is coupled to the remote central office 82. The local network access encoder 88 may communicate with the remote network access encoder 90 over the internet 92. An AMS 46 may be connected to the internet 92.

The network access encoders 88 and 90 preferably have the same structure and are capable of performing the same functions as the network access encoders 44 and 52, which are shown in FIGS. 2, 3A, 3B, 3C and 4 and described with reference thereto. The AMS 46 is as shown and described with respect to FIGS. 2, 3A, 3B, 3C and 5.

Figure 9:
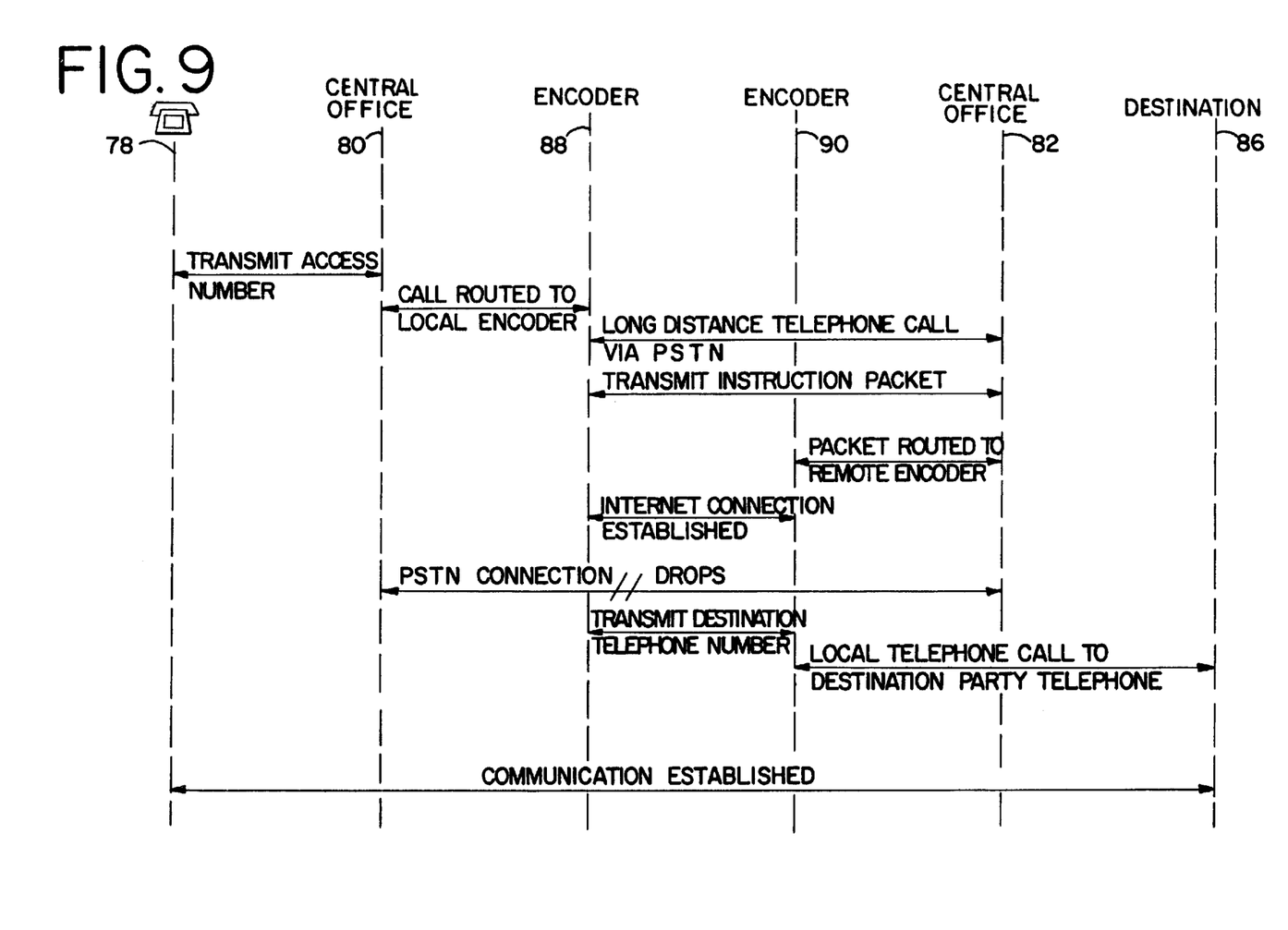
FIG. 9 illustrates a connection sequence for the alternative embodiment shown in FIG. 8.

FIG. 9 illustrates a connection sequence for establishing an internet telephone connection between the telephones 78 and 86 shown in FIG. 8. A caller with a standard telephone, such as the telephone 78, places a call to the local central office 80 (or internet service provider (not shown)) by dialing an internet telephone access number. This number may alternatively be a long distance provider number assigned as an internet telephone access number.

When the call is placed, the local central office 80 routes the call to the local network access encoder 88. The local network access encoder 88 uses a PSTN database to place a telephone call, which may be a long distance telephone call, over the PSTN 84 to the remote central office 82, which is local to the destination telephone 86.

The call would be placed by the local network access encoder 88 to a standardized number, such as one in which the last four digest are "0000" or "9999." When the remote central office 82 receives a call to the standardized suffix, for example, the remote central office 82 automatically forwards the incoming call to the remote network access encoder 90.

Once the PSTN connection is established between the encoders, the local network access encoder 88 transmits a data packet to the remote network access encoder 90 over the PSTN connection through the remote central office 82. The data packet routed to the remote network access encoder 90 preferably contains the following information: (1) the IP address of the local network access encoder 88, and (2) a request for TCP/IP connection. The remote network access encoder 90 receives the IP address of the local network access encoder 88, logs into the internet 92, and contacts the local network access encoder 88 using its IP address, thereby establishing the internet connection The network access encoders 44 and 52, described above, may be programmed to perform the steps of the encoders 88 and 90 using, for example, a file server associated with the encoders.

After the internet connection is established between the local network access encoder 88 and the remote network access encoder 90, the PSTN line connection may be dropped. This allows long distance telephone charges for use of the PSTN to be discontinued. Alternatively, the PSTN line connection may be dropped as soon as the remote network access encoder 90 receives the data packet from the local network access encoder 88.

When the internet connection is established between the local network access encoder 88 and the remote network access encoder 90, the local network access encoder 88 transmits the destination telephone number to the remote network access encoder 90. The remote network access encoder 90 then places a local call to the destination telephone 86 through the remote central office 82 and communication is established between the telephone 78 and the telephone 86. The destination telephone number may alternatively be transmitted over the PSTN.

At this point, both the local network access encoder 88 and the remote access encoder 90 initiate a DSP compression task for transmitting voice over the internet 92. The DSP compression task converts standard audio from the central office PSTN connection into TCP/IP packets and also performs the inverse conversion. That is, the DSP compression task also converts incoming TCP/IP packets from the internet into standard audio for transmission through the central office PSTN connection.

The caller at telephone 78 may then converse with a party at the destination telephone 86 utilizing the connection through the central office 80, local network access encoder 88, internet 92, remote network access encoder 90, remote central office 82 and the destination telephone 86. In addition, a record including the IP address of the remote network access encoder 90 may be stored in a PSTN database associated with the local central office 80 for future calls from the telephone 78 and is preferably added to the database 76 in the AMS 46.

In a preferred mode of operation, the remote network access encoder 90 time stamps a data packet and sends the data packet to the local network access encoder 88. The local network access encoder 88 may then calculate the propagation delay and either return a busy signal to the telephone 78 if the delay is too long or allow the caller at the telephone 78 the option to continue using the internet connection or to place a standard PSTN call.

Thus, the communication system shown in FIG. 8 provides a multi-network (PSTN and internet) solution for establishing an internet telephone connection between the standard telephones 78 and 86. Moreover, the communication system may provide an internet telephone connection between other, and even dissimilar types of customer premises equipment.

As a further alternative, the communication system and connection sequence described with reference to FIGS. 8 and 9 may be used in conduction with the communication system and connection sequences described above with reference to FIGS. 2, 3A, 3B, 3C, 6 and 7. For example, the connection sequence described with respect to FIG. 9 may be initiated if none of the three record types is available from the address mapping server 46. In this case, once an IP address for the remote network access encoder 90 that is local to the destination telephone 86 is determined, the IP address may be added to the database 76 of the address mapping server 46 and/or may be stored locally for future calls.

Once an internet telephone call has been made to a particular destination, the IP address associated with that destination may be stored in a data table associated with the local network access encoder, such as the encoders 44 and 88. The data tables may be maintained by a file server (not shown) that supports the network access encoders. By storing the IP address locally, internet connection time may be decreased on subsequent calls since the AMS 46 may not need to be consulted.

Although described with respect to a programming language and network transmission protocol that are currently in widespread used, i.e. HTML TCP/IP, the preferred embodiments of the present invention may be utilized with other network transmission protocols, such as the IP Version 6 protocol or other protocols to be developed, and other programming languages now existing or to be developed.

It is intended that the foregoing detailed description be regarded as illustrative rather than limiting and that it is understood that the following claims, including all equivalents, are intended to define the scope of the invention.

We claim:

1. A telephony method for communicating over an internet utilizing a local encoder and a remote encoder that are connected by a public switched telephone network, comprising steps of:

establishing a connection between a user and the local encoder;

placing a call between the local encoder and the remote encoder via a public switched telephone network connection;

transmitting a data packet between the local encoder and the remote encoder over the public switched telephone network connection;

establishing an internet connection between the local encoder and the remote encoder using information within the data packet; and dropping the public switched telephone network connection between the local encoder and the remote encoder.

2. A telephony method as claimed in claim 1, further comprising the step of placing a local telephone call to a destination telephone number from the remote encoder.

3. A telephony method as claimed in claim 1, further comprising the step of transmitting an address associated with the local encoder to the remote encoder.

4. A telephony method as claimed in claim 3, wherein said establishing step comprises the steps of:

receiving the transmitted address at the remote encoder;

logging into the internet; and contacting the local encoder using the address.

5. A telephony method as claimed in claim 1, further comprising the step of configuring the local encoder and the remote encoder for internet telephony.

6. A telephony method as claimed in claim 5, wherein the configuration step is performed after the internet connection is established.

7. A telephony method as claimed in claim 5, wherein said configuring step comprises loading an internet telephone compression task.

8. A telephony method as claimed in claim 1, further comprising the step of storing an address associated with the remote encoder in a database coupled to the internet.

9. A telephony method as claimed in claim 1, further comprising, after the internet connection is established, the step of transmitting a time stamped data packet to the local encoder from the remote encoder over the internet connection.

10. A telephony method as claimed in claim 1, wherein the step of placing a call between the local encoder and the remote encoder via the public switched telephone network comprises placing a call to a standardized public switched telephone network number.

11. A telephony method as claimed in claim 10, wherein a remote central office receives the call to the standardized public switched telephone network number and automatically forwards the call to the remote encoder.

12. A telephony method as claimed in claim 1, wherein the data packet comprises an Internet Protocol address associated with the local encoder.

13. A telephony method as claimed in claim 1, wherein the data packet further comprises a request for a TCP/IP connection.

14. A telephony method as claimed in claim 13, wherein the step of establishing an internet connection comprises the remote encoder contacting the local encoder over the internet using the Internet Protocol address of the local encoder.

* * * * *